United States Patent [19]

Ohtsuka et al.

[11] Patent Number: 5,297,127
[45] Date of Patent: Mar. 22, 1994

[54] OPTICAL DEVICE

[75] Inventors: Hideki Ohtsuka, Yokosuka; Kazuharu Odawara, Yokohama, both of Japan

[73] Assignee: Kabushiki Kaisha Toshiba, Kawasaki, Japan

[21] Appl. No.: 854,473

[22] Filed: Mar. 17, 1992

[30] Foreign Application Priority Data

Jun. 28, 1991 [JP] Japan ............................. 3-158893

[51] Int. Cl.⁵ ............................................. G11B 7/00
[52] U.S. Cl. ............................ 369/114; 369/44.11; 369/44.14
[58] Field of Search ............... 369/112, 111, 114, 120, 369/100, 124, 116, 44.11, 44.14, 44.15, 44.16

[56] References Cited
U.S. PATENT DOCUMENTS

| | | | |
|---|---|---|---|
| 4,499,572 | 2/1985 | Yoshikawa et al. | 369/111 |
| 4,504,935 | 3/1985 | Jansen | 369/44.16 |
| 4,751,694 | 6/1988 | Naito et al. | 369/112 |
| 4,942,562 | 7/1990 | Suzuki | 369/44.11 |
| 5,063,548 | 11/1991 | Yamashita et al. | 369/44.14 |
| 5,083,302 | 1/1992 | Tsuyuguchi et al. | 369/44.14 |

*Primary Examiner*—Paul M. Dzierzynski
*Assistant Examiner*—Drew A. Dunn
*Attorney, Agent, or Firm*—Finnegan, Henderson, Farabow, Garrett & Dunner

[57] ABSTRACT

One end of each of a plurality of plate springs is fixed to an optical pickup body slidably supported by supporting shafts through sliding bearings, and each of a plurality of bearings is fixed to the other end of each of the plate springs. The bearings are pressed against the supporting shafts by the energizing force of the plate springs, and a force is applied to the optical pickup body by the pressing force of the bearings in a direction opposite to gravity.

5 Claims, 3 Drawing Sheets

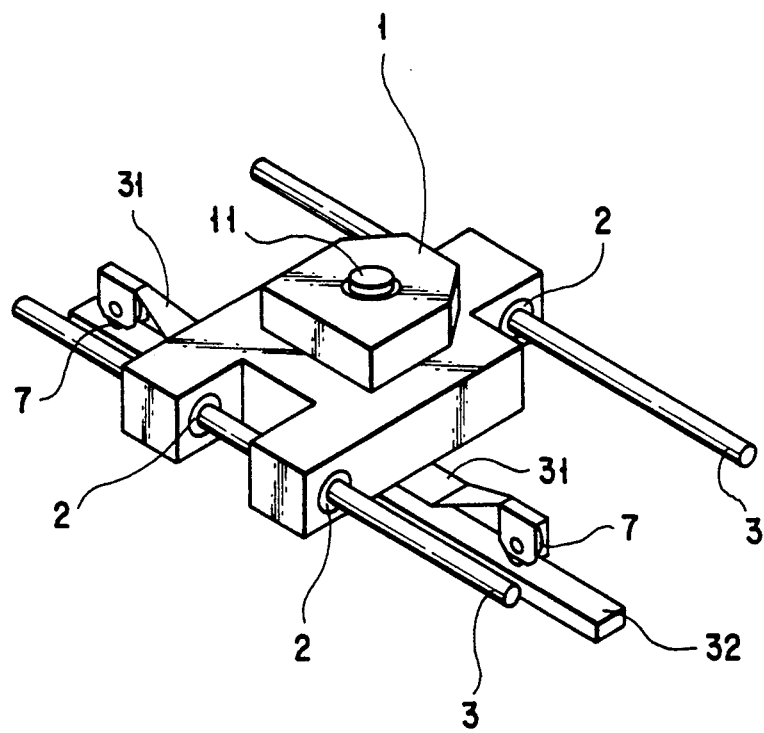
F I G. 3

OPTICAL DEVICE

BACKGROUND OF THE INVENTION

1. Field of the Invention

The present invention relates to an optical device applied to an optical disk drive apparatus to serve as an optical pickup device for optically recording/ reproducing information on/from an optical disk medium.

2. Description of the Related Art

An optical pickup device for recording/reproducing information on/from an optical disk medium by irradiating the medium with a focused minute laser spot, comprises a minute-movement mechanism for automatically adjusting a position of the optical pickup device relative to the optical disk medium and a rough-movement mechanism for greatly moving the optical pickup device to a target position of the optical disk medium at high speed. Since the rough-movement mechanism requires a precise guide mechanism, a sliding bearing is widely used therefor. The sliding bearing has the advantage of relatively low cost, high productivity, and moderate dumping effect; therefore, it can be widely used as a guide for the rough-movement mechanism of the optical pickup device.

However, the sliding bearing has a drawback in which its frictional resistance is higher than that of a bearing and becomes much higher if it is used for a long period of time. The high frictional resistance of the sliding bearing is a great hindrance to improvement in access characteristics.

SUMMARY OF THE INVENTION

It is accordingly an object of the present invention to provide an optical device which can be guided without increasing in frictional resistance in spite of long use.

To attain the above object, there is provided an optical device comprising:

a main body having information processing means for optically processing information recorded on a recording medium;

supporting shafts for slidably supporting the main body by sliding bearings;

an energizing member whose one end is fixed to the main body; and a roller fixed at the other end of the energizing member, and pressed against the supporting shafts by an energizing force of the energizing member, thereby applying a force to the main body in a direction opposite to gravity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view of an optical pickup device according to still another embodiment of the present invention.

DETAILED DESCRIPTION OF THE PREFERRED EMBODIMENTS

An optical pickup device according to an embodiment of the present invention will be described in detail with reference to FIG. 1.

Figure 1:
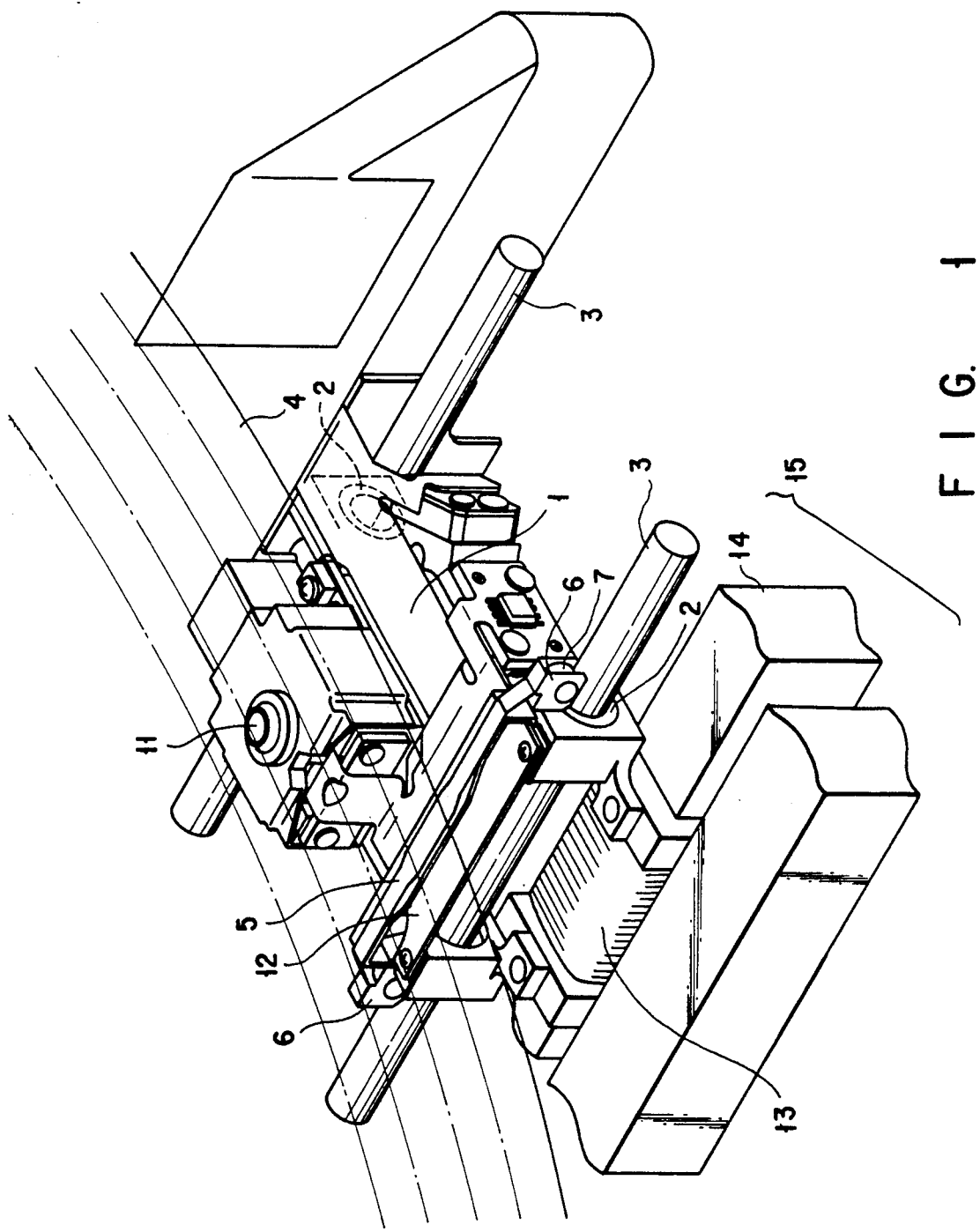
FIG. 1 is a perspective view of an optical pickup device according to an embodiment of the present invention.
Figure 2:
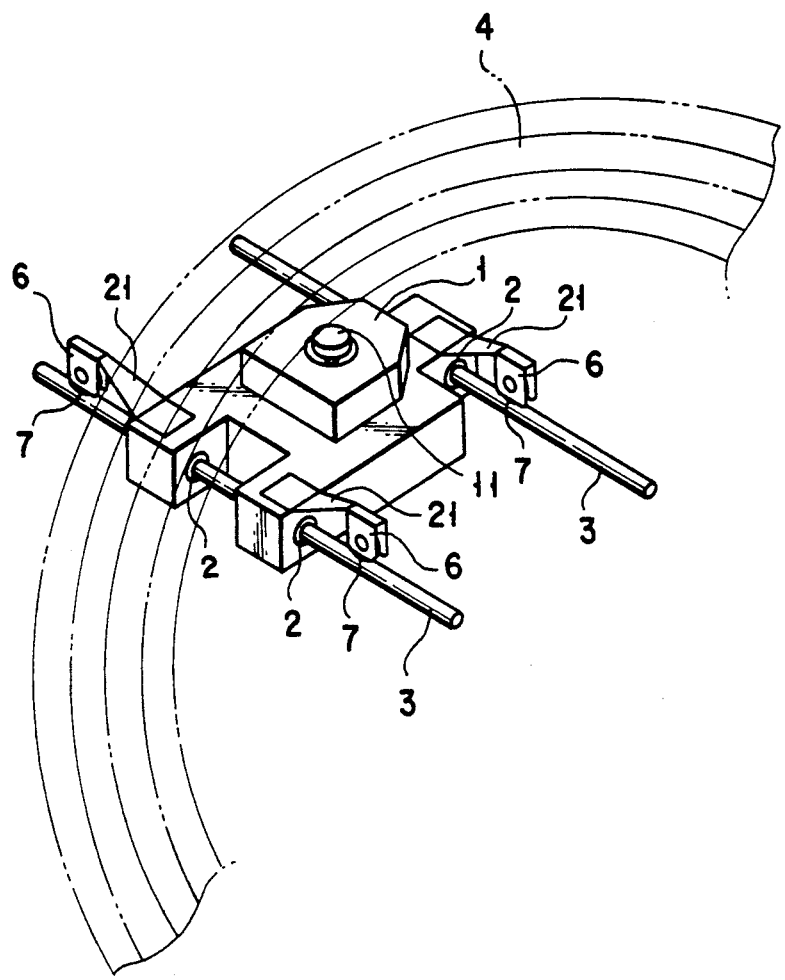
FIG. 2 is a perspective view of an optical pickup device according to another embodiment of the present invention.

In FIG. 1, reference numeral 1 indicates an optical pickup body serving as a main body. The optical pickup body 1 holds an information processing means (not shown) having a semiconductor laser for emitting a laser beam, an optical system for guiding the laser beam to an optical disk 4 described later, and a photodetector for receiving reflection light from the optical disk 4 and converting the light into a light signal.

Both ends of the optical pickup body 1 are slidably supported by two supporting shafts 3 through sliding bearings 2. The optical pickup body 1 is driven by a driving mechanism 15 composed of a coil 13 and yoke 14 and slides in a diametrical direction of the optical disk 4 serving as a recording medium by the supporting shafts 3.

A plate spring 5 serving as an energizing member is fixed to one upper side of the optical pickup body 1 by means of a fixture 12. Bearings 7 serving as rollers are rotatably fixed to both ends of the plate spring 5 by means of fixtures 6. The bearings 7 are pressed against supporting shafts 3 by an energizing force of the plate spring 5 and rotate on the supporting shafts 3 when the optical pickup body 1 moves. If the bearings 7 are pressed against the supporting shafts 3, a force is applied to the optical pickup body 1 by the plate spring 5 in a direction opposite to gravity. The force of the plate spring 5 is set to such a value as to cancel the pressing force of the optical pickup body 1 which is applied to the sliding bearings 2 by its own weight. When the optical pickup body is driven by the driving mechanism 15, it is moved in the radial direction of the optical disk along the supporting shafts 3 and then accessed, and an objective lens 11 is moved in the optical axis direction and focused. After that, a focused minute laser spot is emitted onto the optical disk medium, and information is recorded/reproduced thereon/therefrom.

As described above, since the force is applied to the optical pickup body 1 by the plate spring 5 and the bearings 7 in the direction opposite to gravity, the weight of the body 1 does not act on the sliding bearings 2. The pressing force applied to the sliding bearings 2 is greatly reduced, the driving resistance is lowered, and the access characteristics are improved. Furthermore, since the wearing of the sliding bearings 2 is decreased, the optical device does not deteriorate suddenly even though it is used for a long period of time.

In the above embodiment, the force of the plate spring 5 is set so that the pressing force applied to the sliding bearings 2 is 0. However, the pressing force can be set to a value other than 0.

In the above embodiment, the bearings 7 are fixed to both ends of the single plate spring 5. As shown in FIG.

2, however, the bearings 7 can be fixed to their respective plate springs 21.

In the above embodiment, the plate spring 5 is fixed to the upper side of the optical pickup body 1. As shown in FIG. 3, however, plate springs 31 each having the bearing 7 can be fixed to the lower side of the optical pickup body 1, and the bearings 7 of the plate springs 31 can be pressed against the upper surface of a guide rail 32, thereby lifting the optical pickup body 1.

As described above, according to the present invention, the pressing force applied to the sliding bearings can be set to the optimum value, and the deterioration of access characteristic due to the driving resistance and the friction of the bearings can be lessened. Consequently, the present invention has the advantage that the access characteristic of the optical device can be improved and stabilized for a long period of time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical device comprising:
   information processing means for optically processing information recorded on a recording medium;
   a main body for holding said information processing means;
   a first supporting shaft for guiding one end of said main body;
   a second supporting shaft, arranged parallel to said first supporting shaft, for guiding another end of said main body;
   sliding bearings, arranged between said main body and said first and second supporting shafts, for slidably supporting said main body with respect to said first and second supporting shafts;
   a first energizing member arranged on an upper surface and on a first side of said one end of said main body and having an energizing force applied toward said first supporting shaft;
   a second energizing member arranged on the upper surface and on a second side of said one end of said main body and having an energizing force applied toward said first supporting shaft;
   a third energizing member arranged on an upper surface of said another end of said main body and having an energizing force applied toward said second supporting shaft;
   a first roller coupled to said first energizing member, and pressed against said first supporting shaft by the energizing force of said first energizing member;
   a second roller coupled to said second energizing member, and pressed against said first supporting shaft by the energizing force of said second energizing member; and a third roller coupled to said third energizing member, and pressed against said second supporting shaft by the energizing force of said third energizing member.

2. The optical device according to claim 1, wherein said recording medium is an optical disk.

3. The optical device according to claim 1, wherein each of said first, second, and third energizing members is a plate spring.

4. The optical device according to claim 1, wherein each of said first, second, and third rollers is a bearing.

5. An optical device comprising:
   information processing means for optically processing information recorded on a recording medium;
   a main body for holding said information processing means;
   a first supporting shaft for guiding one end of said main body;
   a second supporting shaft, arranged parallel to said first supporting shaft, for guiding another end of said main body;
   sliding bearings, arranged between said main body and said first and second supporting shafts, for slidably supporting said main body with respect to said first and second supporting shafts;
   an energizing member arranged on an upper surface of said one end of said main body and having an energizing force applied toward said first supporting shaft;
   a first roller coupled to a first side of said energizing member, and pressed against said first supporting shaft by the energizing force of said energizing member; and
   a second roller coupled to a second side of said energizing member, and pressed against said first supporting shaft by the energizing force of said energizing member.

* * * * *